May 11, 1937.  W. ERNST  2,079,904
AUTOMATIC MINIMUM PRESSURE CONTROL FOR OPERATING MACHINERY
Filed July 11, 1932  4 Sheets-Sheet 4

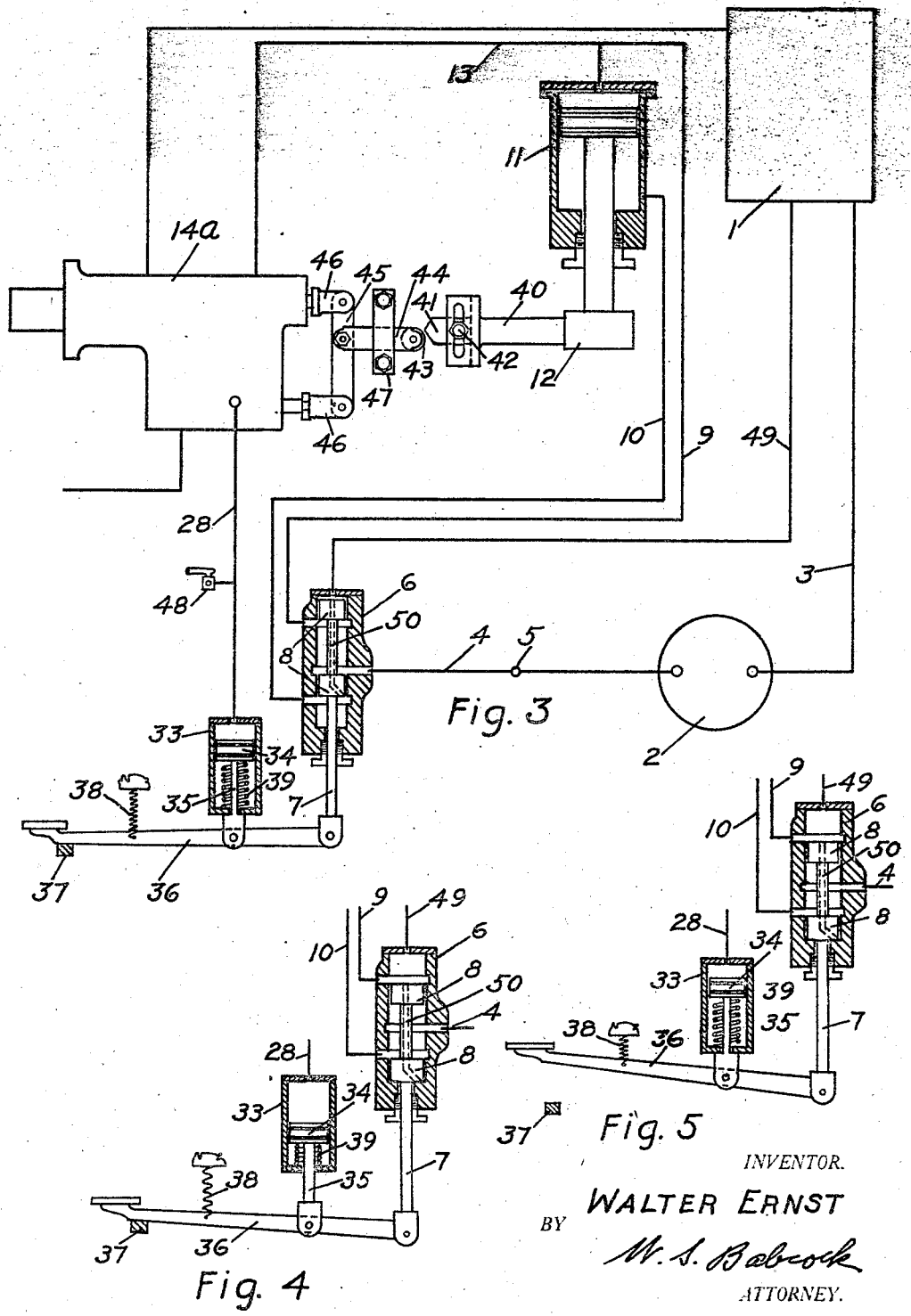

INVENTOR
WALTER ERNST.
BY
ATTORNEYS

Patented May 11, 1937

2,079,904

UNITED STATES PATENT OFFICE 2,079,904

AUTOMATIC MINIMUM PRESSURE CONTROL FOR OPERATING MACHINERY

Walter Ernst, Mount Gilead, Ohio, assignor, by mesne assignments, to The Hydraulic Press Corporation, Inc., Wilmington, Del., a corporation of Delaware Application July 11, 1932, Serial No. 621,945

6 Claims. (Cl. 121—38)

The invention to be hereinafter described relates to automatic pressure control for operating machinery, and more particularly to automatic control of minimum pressure.

Fluid pressure operated presses, such as the well known and widely used hydraulic presses, have long been equipped with pressure gages to indicate the pressure. But this requires watching by the operator and is, therefore, dependent upon him. In many cases, fluid pressure operated machinery has been provided with automatic over-load safety devices which operate to prevent excessive pressure within the operating line or circuit. Such devices are natural developments in saving and safeguarding machinery and equipment. On the other hand, the automatic guarantee of a sufficient or minimum pressure to accomplish a desired result does not involve similar problems and does not seek a similar result. Its desirability is very widespread and of exceptional utility. In many and varied industries, particularly those of great magnitude, a forced-fit union of parts is an essential part of the operations. This is made by forcing one part into a hole, bore, socket or the like, in another. In all such cases there must be a tight binding union—which has become known in the industries as a "forced-fit". For instance, in the mounting of freight car wheels on their axles, such a method is used. Very high pressure is used in forcing the axle and wheel together. The metal of the hub is powerfully compressed outwardly while the metal of the axle is similarly compressed inwardly. This makes a solid binding fit, almost as solid as though integral. A certain, predetermined minimum pressure is absolutely required on a press of known capacity, in order to produce the required tightness of fit. This must overcome a definite corresponding resistance set up by the parts during such forced-fit assembly. That resistance, other factors being known, is determined by the degree of tightness of the fits of the parts or the relative diameters (in round work) or cross section in other work. So, where the relative diameters are such as to set up the proper resistance, a corresponding predetermined and calculable minimum pressure is necessary. Heretofore, this pressure has been manually controlled by the operator. Obviously, the element of human error plays an important rôle here and many weak and imperfect forced-fits result. The great danger of such errors becomes obvious in the case of car wheels, referred to. Suppose that the operator assembles a car wheel on its axle with too loose a fit, one where the tolerance of diameters has been exceeded in the direction of loose fit. The wheel, in use, works loose. It may, easily cause a disastrous wreck. The same is true as to assemblies for automobiles, engines, power machinery, etc., as will be obvious. The present invention has been designed and developed to completely eliminate the entire element of human error in all of this class of forced-fits and to automatically apply the above known facts, by reversing the travel of the assembling ram when the minimum pressure required for an acceptable binding forced-fit has not been built up by the resistance of the fit. It thereby becomes an unfailing, accurate, automatic inspector, rejecting all such imperfect fits or unions.

In order to more clearly disclose the construction, operation and use of the invention, reference should be had to the accompanying drawings forming part of the present application. Throughout the several figures of the drawings, like reference characters designate the same parts in the different views.

In the drawings:—

Fig. 3 is a diagrammatic view of the fluid pressure circuits, with some of the apparatus in section with the treadle depressed by the operator, and its control valve in the raised or "forward" position;

Fig. 4 is a fragmentary cross sectional view showing the ram control valve in the lowered or reversing position, and moveable fulcrum lowered because of similarly faulty work pieces, and;

Fig. 5 is a view similar to Fig. 4, but with the moveable fulcrum up, the treadle released by the operator, and its control valve in the lowered or "reversing" position, because of properly fitted and acceptable work pieces;

For illustrative purposes, the invention will be described as applied to a well known and widely used type of fluid operated press. The general construction and operation of the press is all well known to those skilled in the art and, therefore, need not be repeated here.

Figure 1:
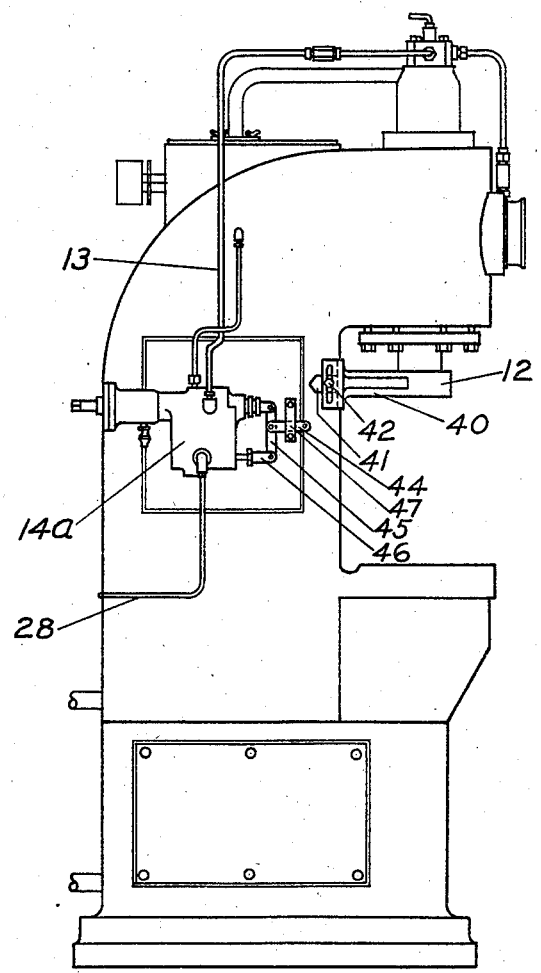
Fig. 1 is a side elevation of a well known type of hydraulic press, with the invention applied.
Figure 2:
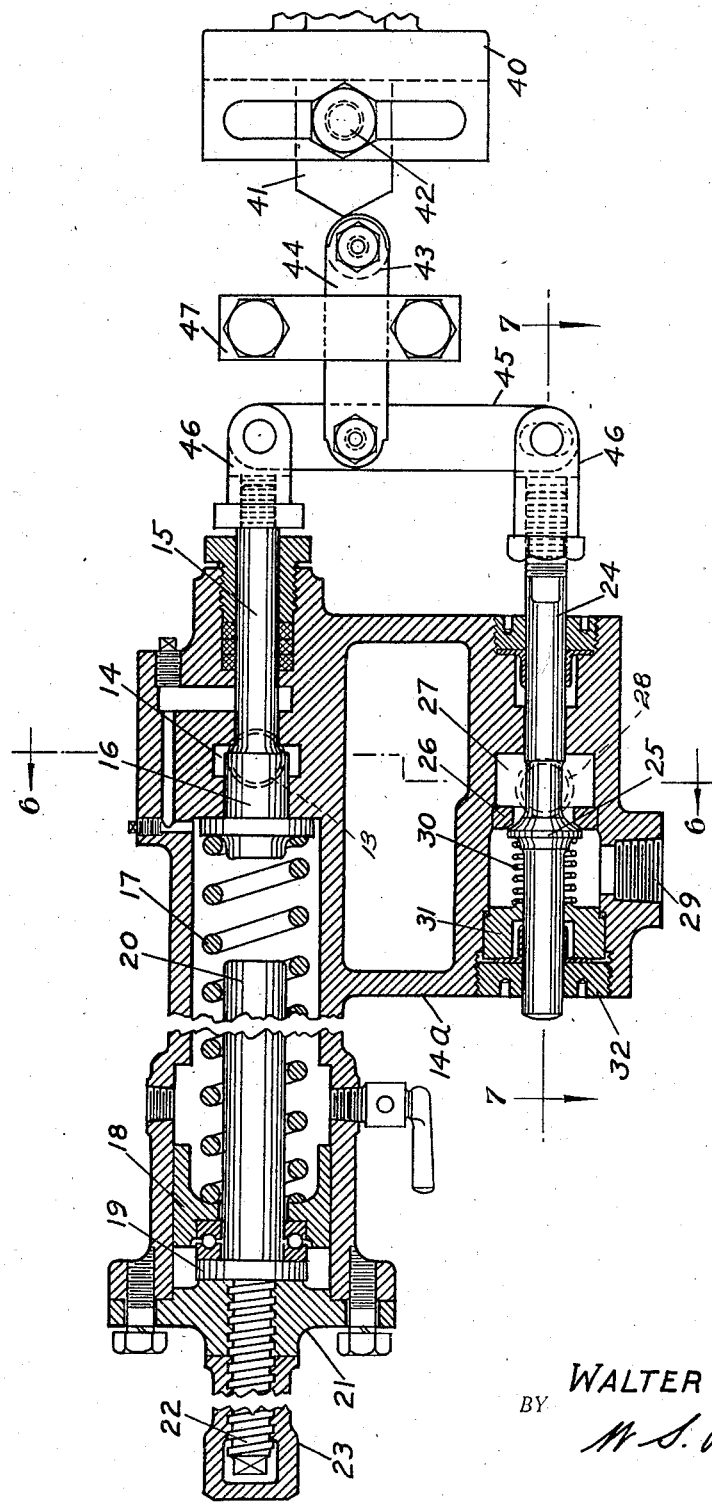
Fig. 2 is an enlarged longitudinal cross section through the control mechanism with the parts in position about to cause the reversal of the press because of a rejectably loose fit on the work pieces being assembled.
Figure 6:
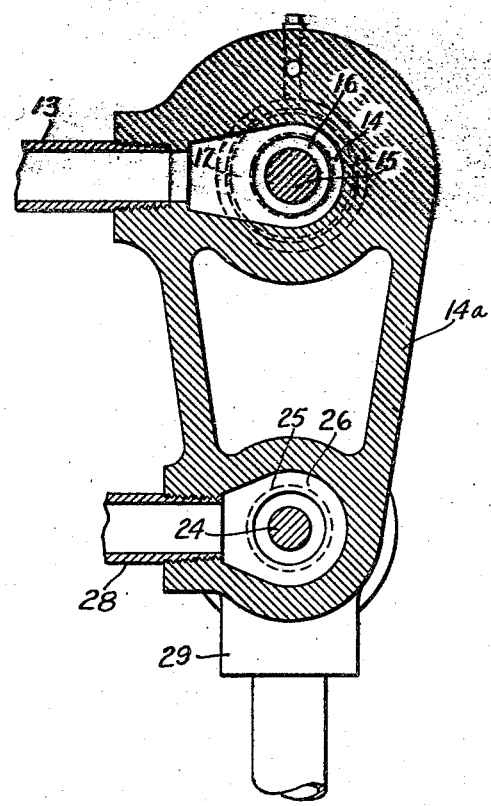
Fig. 6 is a cross sectional view along the line 6—6 of Fig. 2.
Figure 7:
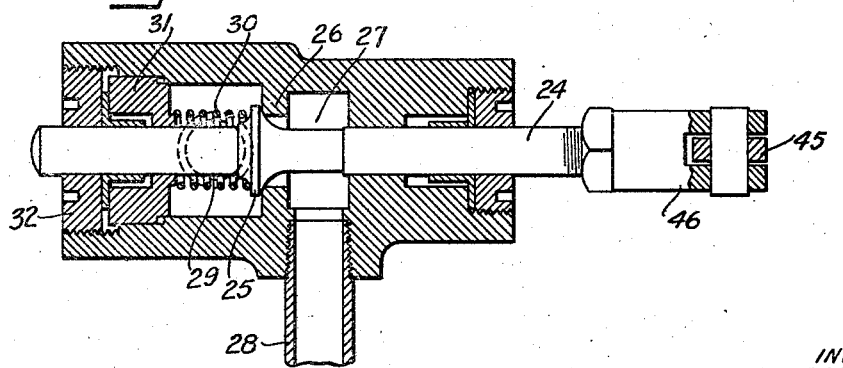
Fig. 7 is a longitudinal sectional view along the line 7—7 of Fig. 2.

Referring to the drawings, in detail, Fig. 3 shows all parts and circuits in their relative starting positions. Let it first be assumed that work pieces are in place to be engaged by the ram for forced-fit assembly, and that their diameters are not within the tolerances allowed, so that they will result in rejectably loose fits. To start the press, the operator places his foot on the foot treadle 36, then in the position of Fig. 5, and and presses it downward against the stop 37, thereby pushing the valve 8 upward into the position of Fig. 3. Pressure fluid then passes from tank 1 by suction line 3 to pump 2, from it through feed line 4 (with pressure relief valve 5) to the control and reversing valve chamber 6, and between the valves 8 on the valve stem 7. From valve chamber 6 it passes through the upper outlet, which is now open and into the direct pressure line 9, leading to the upper end of the ram cylinder 11 above the piston head of the ram which carries the usual ram head 12. The ram starts down and its head engages the work piece. As the work pieces have been assumed to be rejectably loose fitting, the resistance set up is insufficient and the automatic inspector or controller steps in to prevent completion of the stroke and reject the work. A branch 13 is continued from pipe line 9 to a plunger chamber 14 in a casting or housing 14a. Within the casting and extending through the chamber 14 is reciprocably mounted a differential plunger 15, the stem of which passes through and beyond the casting. It has its free end threaded, for a purpose to be later disclosed. Plunger 15 is provided with a head 16 on its inner end, extending beyond the plunger chamber and adapted to engage the casting wall which acts as a stop to the differential plunger 15 in its travel toward the plunger chamber. Pressure from branch 13 in chamber 14 acts upon head 16 and tends to move it inward or toward the left. A pressure regulating compression spring 17, or other acceptable corresponding means, within a bore or chamber of the casting engages the inner end of the head 16 and yieldingly holds it against the pressure in the chamber 14 and branch line 13. The power of this device may be varied, as desired. A threaded cap-nut 23 fits over and protects the end of the centering and guide rod 22 which extends within the coil spring and which carries a collar 19 which engages a cup 18 in which is seated one end of the spring. The end 22 of the rod 20 is threaded through the end plate 21 of the casting. So, by removing the cap-nut and turning the rod in one direction or the other, the spring may be put under any desired compression, so that the pressure in the valve chamber 14 will be substantially synchronized with that in the cylinder. That, in turn, will require a corresponding built up pressure in the ram cylinder, for the operating stroke. In this way, the minimum operating pressure of the ram may be pre-set at any desired amount. The differential plunger is a ground fit within the casting and has no packing subject to pressure, as the friction of such packings would affect the accuracy of the pressure regulation, as will be readily understood. In the operation of the device, some fluid may slip by the plunger. If so, it will gather in the by-pass indicated and go around the valve and into the spring chamber from which it will flow back to the tank by the line indicated. The parts are in the positions shown in Figures 2 and 3. Ram head 12 carries an arm 40 with a vertically slotted and vertically grooved head in which is slidably mounted a cam 41 which may be adjustably secured by a bolt 42 at any desired point. As the ram descends, the cam will engage a roller 43 on the end of the arm 44 which is pivoted at its opposite end to a link 45. Link 45 carries, pivotally connected to its opposite ends, threaded yokes or fittings 46, one of which adjustably receives the threaded projecting end of the differential plunger, while the other similarly receives the threaded projecting end of a poppet valve stem 24, to be later disclosed. The arm 44, extending horizontally, as it does, passes freely beneath a guide plate 47 which is spaced from the machine frame by suitable washers, spacing blocks, or the like, through which and the plate 47, the attaching bolts pass. The plate and spacers are so disposed, relatively to the arm 44, as to prevent downward swing of the arm below the horizontal, while permitting considerable upward swing, for purposes to be later disclosed. The poppet valve stem 24, carrying valve 25, which closes the seat 26, is reciprocable within the casting in the same general direction as the differential plunger and controls the flow of pressure fluid from the fluid pressure inlet chamber 29 into the outlet chamber 27 and thence into the releasing line 28. Stem 24 is extended through the casting wall and passes through a follower 31 which engages one end of a coil compression spring the opposite end of which engages valve 25 to keep it normally seated. A nut 32 threaded into the casting about the poppet valve stem engages the follower 31 and acts to vary the compression or power of the coil spring 30 as desired. As the cam engages roller 43 it will force the arm 44 horizontally to the left. This will rock the link 45 about its pivotal connection with the differential plunger 15. The power of the differential plunger spring 17, of course, is far greater than that of the poppet valve spring 30, so that the poppet valve 24 is easily moved by the above action. To have the device reasonably sensitive and quickly responsive the arm 44 is pivoted to link 45 at a point considerably nearer the end of the differential plunger than the end of the poppet valve, so that a very slight horizontal movement of the arm 44 will be considerably multiplied at the poppet valve 24. This, in turn, reduces the duration of engagement between 41 and 43, as well as the area of contact between them. By the threaded connection between the yokes 46 and the differential plunger 15 and poppet valve stem 24, respectively, this adjustment may be further refined. As link 45 is rocked, the poppet valve 25 will be opened and fluid pressure, from any suitable source, will pass from chamber 29 into chamber 27 and thence into the release line 28. As the cam 41 escapes roller 43, spring 30 will reseat valve 25, holding the pressure in line 28 and returning roller 43 into the path of the cam. From line 28, the pressure will pass into the cylinder 33 above the head 34 and drive that piston down against the power of the compression spring 39. This carries the travelling fulcrum 35 and treadle 36 down. But the fulcrum moves down while the free end remains stationary on the stop 37. This compels the opposite end connected to the valve stem 7 to move down. This, in turn, automatically, shifts the control valve 6, 7, 8, into reversing position, as in Fig. 4. In this position it is impossible for the operator to move the control valve. No degree of pressure on the free end of the treadle will be effective, as it is held against the stop or rest bar 37. At this point the ram will discontinue its operation and leave the pieces unassembled. The forced-fit will be left unfinished and rejected. The pressure fluid will pass from the feed line 4 through the reversing valve chamber 6, into the line 10 and beneath the piston head of the ram, reversing it. The exhaust fluid will come back through line 9 from the opposite side of the ram piston head into the valve casing above the valve, into the exhaust line 49 and back to the tank 1. As the ram travels up, the cam 41 will engage roller 43 and lift or kick it up, slightly, about its pivot without effecting any horizontal movement. The arm 44 and roller 43, of course, drop back again to the horizontal position, as the cam passes.

At this point, it should be mentioned, that the moveable treadle fulcrum as here provided and arranged is also a safety device. In its pressure action the treadle travels downwardly or away from the machine frame. At the time of and during that travel, the free end is stationary and remains resting on stop 37, while the fulcrum and opposite end move. This is a very important advantage over automatic devices which keep the operator continually on his guard to avoid being caught by the device and injured. In this case, for instance, if the pressure action were up instead of down, the operator might have his foot caught and crushed without warning. As it is, it constitutes, instead, a safety device adding confidence and removing nervousness.

To reset the device so that the automatic inspector or controller may function on the next down stroke, if desired, the operator will open the plug cock 48 in the release line 28 to permit the pressure to drop so that spring 39 will return the piston head 34 and rod 35, raising the moveable fulcrum of treadle 36 to normal position. As the fulcrum moves up, the back pressure in line 10 acting on the lower valve 8, and the tension of spring 38, will both act to rock the treadle about the fulcrum and raise the free end. To start the press for the next working stroke, the operator now depresses the free end of the treadle and thereby shifts the valve 7, 8 to its starting position (Fig. 3). In contrast, let us now assume that the work piece being assembled is within the allowed tolerances, offers the required resistance, and builds up the necessary pressure in the ram cylinder. As the pressure reaches the required amount it acts through branch 13 on the valve head 16 in chamber 14 and forces that valve inwardly against the action of the spring 17, drawing link 45 and arm 44 in the same direction. This takes the roller 43 out of the path of the cam 41 and permits the ram to complete its stroke and finish the assembly. This inward movement is very slight and is governed by the interval between yoke 46 and the adjacent end wall of the casing or casting 14a. The amount of this travel is regulated by the screw threaded connection between the differential plunger end and its yoke 46, as will be readily understood. Thus, every work piece offering the necessary resistance to the ram, will automatically effect withdrawal of the roller 43 to an inoperative position and prevent operation of the automatic inspector or controller; and every work piece offering less than the necessary resistance will permit the roller to remain in an operative position so as to cause operation of the automatic inspector or controller. As the ram completes its downward stroke on any work piece in which the assembly is acceptable, the operator starts the reversal by simply releasing the treadle, as will be obvious.

It will be understood, of course, that the device and its several parts are all mounted in well known and usual manner on the machine frame or in close proximity thereto. The valve chamber 6, casting 14a, and fulcrum piston cylinder 33, for instance, may all be securely bolted or similarly secured to the machine frame. That is a convenient, though not essential arrangement.

The invention has been illustrated and described in its application to a press, but is in no sense limited to use with a press. It is equally applicable to a great variety and wide field of uses in which a moving part acts upon or against a work piece or another part, and in which the operation should be interrupted or prevented except when such moving part meets a predetermined resistance from the work piece or other part. The particular kind of work performed and the particular type of machine used are both minor considerations, as far as this invention is concerned. It is intended to include within this case all such applications and uses of the invention, and the claims are to be so read and construed.

Many changes may be made in the construction and arrangement of the various parts of the invention, within the scope of the appended claims, without in any way departing from the spirit and intent of the invention, and it is meant to include all such within this application. A single preferred form has been illustrated merely by way of example and with no thought or intention of in any degree limiting the application by such illustration.

What I claim and desire to protect by Letters Patent is:—

1. An operating unit for regulating the supply of pressure fluid to a hydraulically operated device associated with a hydraulic machine, said operating unit comprising a hydraulic piston, a valve member for valving the pressure fluid used in operating said device, a connecting member mechanically joining said piston and said valve member, and a valve-actuating member mounted upon said connecting member and adapted by its engagement with a moving part of said machine to shift said valve member, said connecting member serving as a floating fulcrum for said valve-actuating member, said valve-actuating member being arranged to be automatically drawn by said hydraulic piston into a position where it is unengageable by said moving part when said piston is acted upon by a predetermined pressure in said press.

2. An operating unit for regulating the supply of pressure fluid to a hydraulically operated device associated with a hydraulic machine, said operating unit comprising a hydraulic piston, a valve member for valving the pressure fluid used in operating said device, a connecting member mechanically joining said piston and said valve member, a valve-actuating member mounted upon said connecting member and adapted by its engagement with a moving part of said machine to shift said valve member, said connecting member serving as a floating fulcrum for said valve-actuating member, said valve-actuating member being arranged to be automatically drawn by said hydraulic piston into a position where it is unengageable by said moving part when said piston is acted upon by a predetermined pressure in said press, and means for rendering said valve-actuating member inoperative to shift said valve during the motion of said machine part in one direction only.

3. In a hydraulic press circuit, a pump, a hydraulic press having a reciprocable platen, a hydraulically operated reversing instrumentality for reversing the fluid flow from said pump to said press, a manually-operated lever for manually operating said reversing instrumentality, a hydraulic motor connected to said lever as a movable fulcrum, a valve for regulating the hydraulic operation of said reversing instrumentality, a valve actuator engageable with said platen to shift said valve during the travel of said platen, and a hydraulic piston connected to said valve actuator, said hydraulic piston being responsive to the attainment of a predetermined pressure in said press circuit to thereby withdraw said valve actuator from engageability with said platen during the reciprocation thereof, whereby to prevent the automatic operation of said reversing instrumentality when the resistance of the workpiece to the platen reaches a predetermined amount.

4. A controlling device for a circuit containing a pump and a hydraulic machine with a reversible element comprising a reversing instrumentality for reversing the flow of fluid from the pump to said machine, a manually operable member connected to operate said reversing instrumentality manually, a movable fulcrum support for said manually operable member, a hydraulic motor arranged to move said fulcrum support, and means cooperating with said motor to cause said manually operable member to be automatically shifted into a manually inoperative position in response to the operation of said motor.

5. A controlling device for a circuit containing a pump and a hydraulic machine with a reversible element comprising a reversing instrumentality for reversing the flow of fluid from the pump to said machine, a manually operable member connected to operate said reversing instrumentality manually, a movable fulcrum support for said manually operable member, a hydraulic motor arranged to move said fulcrum support, and means for preventing the manual operation of said manually operable member while said member is operated by said hydraulic motor.

6. A controlling device for a circuit containing a pump and a hydraulic machine with a reversible element comprising a reversing instrumentality for reversing the flow of fluid from the pump to said machine, a manually operable member connected to operate said reversing instrumentality manually, a movable fulcrum support for said manually operable member, a hydraulic motor arranged to move said fulcrum support, and a stationary fulcrum member adapted to cooperate with said manually operable member and said movable fulcrum to render said manually operable member selectively operable manually in one position and inoperable manually in another position.

WALTER ERNST.